US006800026B2

(12) United States Patent
Cannon

(10) Patent No.: US 6,800,026 B2
(45) Date of Patent: Oct. 5, 2004

(54) METHOD AND APPARATUS FOR COMPETITIVE BONUS GAMES WITH A PLAYER AS THE HOUSE

(75) Inventor: Lee E. Cannon, Bozeman, MT (US)

(73) Assignee: IGT, Reno, NV (US)

( * ) Notice: Subject to any disclaimer, the term of this patent is extended or adjusted under 35 U.S.C. 154(b) by 184 days.

(21) Appl. No.: 10/005,849

(22) Filed: Dec. 5, 2001

(65) Prior Publication Data

US 2003/0104854 A1 Jun. 5, 2003

(51) Int. Cl.[7] .................................................. A63F 13/10
(52) U.S. Cl. ............................... 463/16; 463/1; 463/25; 463/30
(58) Field of Search ............................... 463/11–13, 16, 463/25–28, 42; 273/274

(56) References Cited

U.S. PATENT DOCUMENTS 5,560,603 A 10/1996 Seelig et al.
5,664,998 A 9/1997 Seelig et al.
RE35,864 E * 7/1998 Weingardt ................... 463/28
5,779,544 A 7/1998 Seelig et al.
5,823,874 A 10/1998 Adams
5,823,879 A * 10/1998 Goldberg et al. ............. 463/42
5,848,932 A 12/1998 Adams
5,876,284 A 3/1999 Acres et al.
5,882,261 A 3/1999 Adams
5,980,384 A 11/1999 Barrie
6,012,982 A 1/2000 Piechowiak et al.
6,089,976 A 7/2000 Schneider et al.
6,089,978 A 7/2000 Adams
6,146,273 A 11/2000 Olsen

OTHER PUBLICATIONS

Scarne's New Complete Guide to Gambling, John Scarne, 1974 Simon and Schuster pp. 459–479.*

* cited by examiner

*Primary Examiner*—Mark Sager
*Assistant Examiner*—Robert E. Mosser
(74) *Attorney, Agent, or Firm*—Marshall, Gerstein & Borun LLP

(57) ABSTRACT

The present invention relates to gaming systems and methods where enablement for play of a bonus game is linked to play of a primary game. A player may qualify for the bonus game by preselected criteria associated with play of the primary game. At least one player is enabled to play the bonus game against at least one other player by assuming a role of the house. At least one other player is enabled to play the bonus game against the house. The at least one player who assumes the house role may be awarded the wagers, or a percentage of the wagers, lost by the at least one other player wagering against the house.

22 Claims, 3 Drawing Sheets

METHOD AND APPARATUS FOR COMPETITIVE BONUS GAMES WITH A PLAYER AS THE HOUSE

BACKGROUND OF THE INVENTION

1. Field of the Invention

The present invention relates generally to gaming systems and methods. More specifically, the present invention relates to gaming systems and methods wherein a player is able to wager against other players in a bonus game by assuming a role as the house in the bonus game.

2. State of the Art

Various mechanical and electronic gaming systems and their associated apparatus and methods of use are well known in the gaming industry. Slot machines have long been a significant part of the gaming industry and, now, video versions of slot machines are very popular.

Gaming establishments are continually searching for new games and gaming systems to keep the interest of players. Gaming establishments are concerned that if players lose interest in a game, the gaming machine will sit idle and not contribute to the revenue of the casino. By developing new games, the gaming establishments hope to pique existing players' interests in continued wagering and to attract new players. In addition, players may tend to be more active and consistent in playing the gaming machines that have new games, thus enhancing the potential profit of the gaming machine.

To keep and increase players' interest in gaming, the gaming industry has added "bonus games" to many of its games, including reel and electronic slot machines. A bonus game is a secondary game that is typically activated when the player achieves a specific outcome in a primary game. For instance, the bonus game may be activated when the player receives a winning hand (in the case of a card game) or a specified combination of symbols (in the case of a reel-type game) as an outcome of the primary game being played. Bonus games appeal to players because the probability of winning combinations after entry into the bonus game is, at least, greatly enhanced and, in most instances, some sort of winning outcome is guaranteed.

The bonus game is typically a different type of game than the primary game. This provides more excitement and variety for the player and helps to keep the player at the gaming machine for a longer period of time. However, the bonus game may also be the same type of game as the primary game, except that the bonus game has an increased potential for winning in comparison to the primary game.

In many cases, the bonus game is a singular event in that the play changes to the bonus game when the specific outcome is achieved in the primary game. The bonus game is then played to completion. Examples of this type of bonus game are disclosed in U.S. Pat. Nos. 5,823,874, 5,848,932, 5,882,261 and 6,089,978, all to Adams. Various embodiments as disclosed in the aforementioned patents include methods of playing games employing gaming machines as well as table games for play of primary games and at least one payout indicator for a secondary or bonus game. The bonus game is independent of the primary game but is enabled by selected outcomes of the primary game. One embodiment operates such that when the reels of the primary game produce a preselected outcome, the bonus game is enabled. In the bonus game, the player initiates the spin of a wheel or reel bearing a number of payout values, or initiates another bonus event such as a bowling-type or pinball-type payout indicator. When the bonus event is completed, the amount of the bonus payout is indicated. In the bonus games as disclosed in the aforementioned patents, the players are playing against the house and are not playing against one another. The use of the term "house" herein refers to the operator of a gaming establishment.

Another example of a bonus game is described in U.S. Pat. No. 6,089,976 to Schneider et al. In this design, the bonus game displays a multiplicity of images on a video monitor from which the player selects until achieving a pair of matched bonus awards.

In some cases, the bonus game is a more sequential event in that progressing through the bonus game is determined by continued play in the primary game. An example of this is described in U.S. Pat. No. 5,980,384 to Barrie. In that design, the player can win the primary game on each play of the game, and the bonus game can be won over a plurality of plays of the primary game.

The bonus game may be conducted through a plurality of networked games such that the bonus game might involve a plurality of individuals who have been wagering at the primary games. Some examples of bonus gaming include U.S. Pat. Nos. 5,779,544, 5,664,998 and 5,560,603, all to Seelig et al. More particularly, some examples of bonus gaming including a plurality of networked primary gaming machines include U.S. Pat. No. 6,146,273 to Olsen, U.S. Pat. No. 6,012,982 to Piechowiak et al., and U.S. Pat. No. 5,876,284 to Acres et al.

While the above-mentioned bonus games have been used in the gaming industry, improved gaming systems and methods are still needed to pique and maintain players' interests in gaming. Preferably, these improved gaming systems and methods would appeal to the player's competitive nature, introduce novel games of chance, and provide the potential for larger payoffs in comparison to the payoffs in the primary game and in other bonus games. These improved gaming systems and methods would offer a bonus game in which the players compete against one another by allowing one player to assume the role of the house in the bonus game.

Such a bonus game would increase the players' level of excitement because it would place the players in a more competitive setting than during play of a noncompetitive, conventional bonus game. The excitement level increases not only for the player who assumes the role as the house but also for the other players in the bonus game playing against the house. Such a bonus game might be configured to also provide the player who assumes the role as the house with increased potential for winnings, thus appealing to players who are willing to take additional risks in the hopes of greater payouts.

BRIEF SUMMARY OF THE INVENTION

The present invention relates to gaming systems and methods of conducting games of chance which may be employed on multiple linked or networked gaming machines. In one embodiment, a method of conducting a game of chance is disclosed. The method in a broad sense includes configuring a bonus game for play by a plurality of players, wherein at least one player of the plurality is enabled to play in a house role and at least one other player is enabled to play against the house. At least one opportunity is provided for a plurality of players to each play a primary game and to qualify for play of the bonus game, wherein each player enabled for play of the bonus game is enabled to play in at least one of the house role and to play against the house.

In a more specific implementation, the method includes providing at least one gaming machine configured for play of a primary game and providing a first player and at least one other player with an opportunity to place a wager on the primary game. If the first player achieves a first specific outcome during play of the primary game or is otherwise qualified by meeting preselected criteria, a bonus game is activated. The first player is thus enabled to enter the bonus game and wager against the at least one other player, wherein the other player has qualified for the bonus game by achieving a second specific outcome during play of the primary game or by meeting other preselected criteria. The first player wagers against the at least one other player by assuming a role as the house.

The present invention also includes a method of conducting a game of chance which comprises providing a bank of gaming machines, wherein each gaming machine of the bank of gaming machines is configured with a primary game and operably coupled to at least one bonus game display device. A player is provided with an opportunity to place a wager on the primary game and activates a bonus game if play of the primary game results in a first specific outcome or the player meets other preselected criteria. The bonus game is displayed on the at least one bonus game display device. The player who activated the bonus game is further enabled to wager against at least one other player, wherein the at least one other player has qualified for the bonus game by achieving a second specific outcome during play of the primary game or meets other preselected criteria. The first player assumes the role of the house in play of the bonus game against the at least one other player.

A system for playing a game of chance is also provided. The system includes at least one gaming machine configured to play a primary game of chance and a bonus game display device operably coupled to the at least one gaming machine. The bonus game display device is configured to display a bonus game that enables a first player to wager against at least one other player based on the first player achieving a first specific outcome or meeting other preselected criteria and the at least one other player achieving a second specific outcome in the primary game or meets other preselected criteria.

In another embodiment, a gaming system is disclosed. The system includes a plurality of gaming machines, each configured for playing a primary game of chance. At least one bonus game display device is operably coupled to the bank of gaming machines and is configured to display a bonus game. The bonus game is configured to enable a first player to wager against at least one other player based on the first player achieving a first specific outcome in the primary game or meeting other preselected criteria and the at least one other player achieving a second specific outcome in the primary game or meeting other preselected criteria. A central server computer is operably coupled to the bank of gaming machines and configured to communicate gaming data between the gaming machines. A bonus event computer is operably coupled to the central server computer and configured to control bonus play.

It is contemplated that different players may qualify for play in a common bonus game through play of different primary games.

As used herein, the term "game of chance" includes and encompasses not only games having a random or arbitrary outcome but also such games which also invite or require some player input to the game having at least a potential for affecting a game outcome. Such player input is generally termed "skill" whether or not such input is in actuality beneficial in terms of game outcome.

DESCRIPTION OF THE DRAWINGS

By way of example, particular embodiments of the invention will be described with reference to the accompanying drawings, in which like parts have the same index numerals in which.

DETAILED DESCRIPTION OF THE INVENTION

The present invention relates to gaming systems and methods where a bonus game is linked to play of a primary game. A player may qualify for the bonus game by achieving either of two specific outcomes in the primary game, or through other criteria associated with play of the primary game. The first specific outcome or some other preselected criteria enables or qualifies the player to wager or otherwise compete against other players by assuming the role of the house in the bonus game. The second specific outcome or some other preselected criteria enables or qualifies the player to participate, or place wagers, in the bonus game. In addition, the present invention deals with a method of incorporating traditional casino table games, or similar games, as shared bonus games for slot machines.

Figure 1:
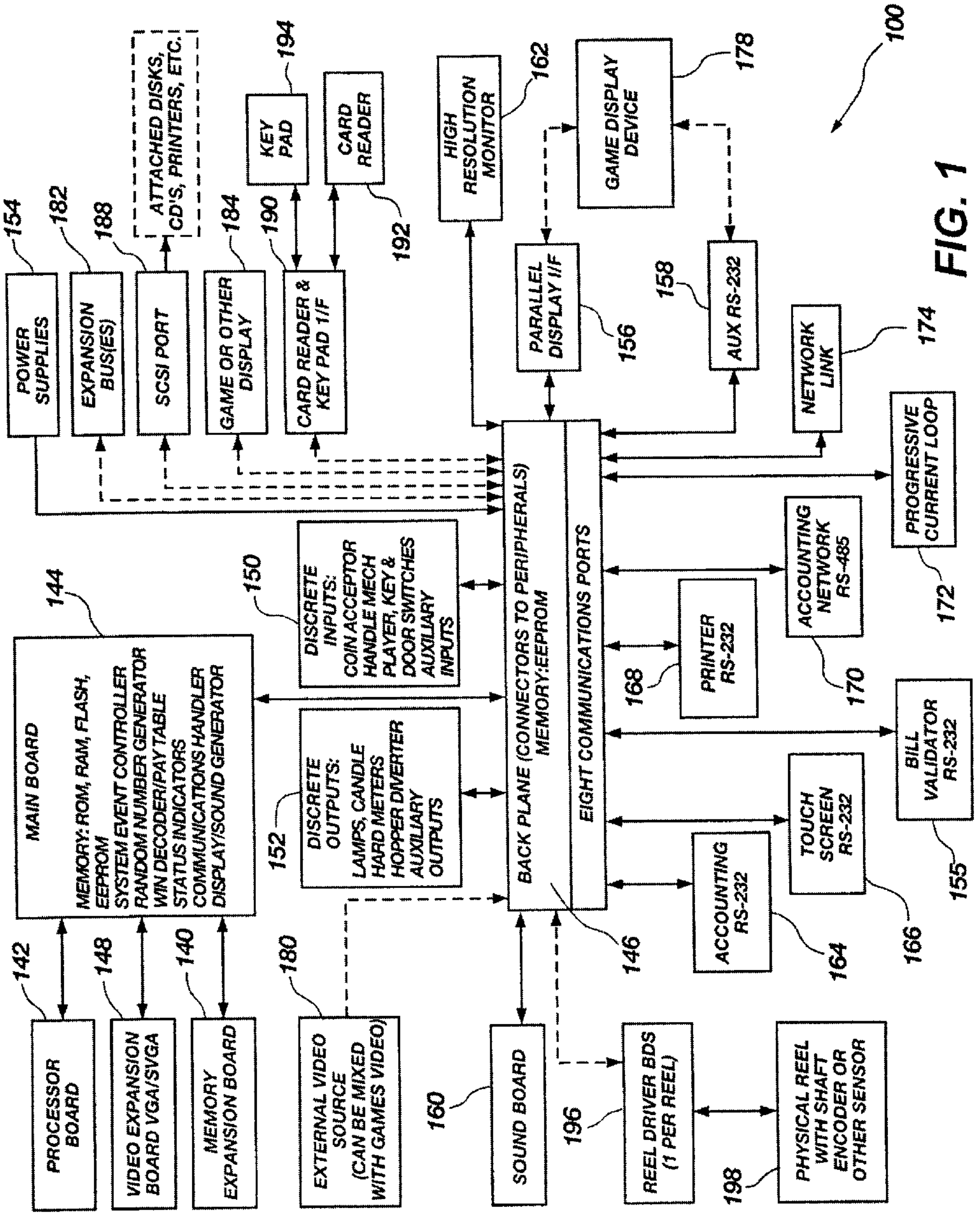
FIG. 1 shows a schematic representation of an exemplary gaming machine according to the present invention.

FIG. 1 illustrates an exemplary gaming machine for use in implementing the bonus game of the present invention. Shown is gaming machine or device 100, which includes a main board 144 and a back plane 146 integrally or separately formed. Memory expansion board 140 as well as processor board 142 including a graphics system processor and video expansion board VGA/SVGA 148 are operably coupled to the main board 144. The main board 144 preferably includes memory in the form of ROM, RAM, flash memory and EEPROM (electrically erasable programmable read only memory). In addition, the main board 144 includes a system event controller, a random number generator, a win decoder/pay table, status indicators, a communications handler and a display/sound generator.

The main board 144 is operably coupled to the back plane 146, which may include additional memory, such as in the form of an EEPROM, and connectors to connect to peripherals. Furthermore, the back plane 146 provides a plurality of communication ports for communicating with external peripherals. The back plane 146 provides the coupling between discrete inputs 150 and the processor board 142 and main board 144. Typical examples of elements which provide discrete inputs are coin acceptors, game buttons, mechanical hand levers, key and door switches and other auxiliary inputs. Furthermore, the back plane 146 provides the coupling between discrete outputs 152 and the processor board 142 and main board 144. Typically, elements that provide discrete outputs are in the form of lamps, hard meters, hoppers, diverters and other auxiliary outputs.

The back plane 146 also provides connectors for at least one power supply 154 for supplying power for the processor board 142 and a parallel display interface "PDI" 156 and a serial interface 158 operably coupled to game display device 178. In addition, the back plane 146 also provides connectors for a sound board 160 and a high-resolution monitor 162 Furthermore, the back plane 146 includes communication ports for operably coupling and communicating with an accounting network 164, a touch screen 166 (which may also serve as a game display device), a bill validator 54 incorporated in a currency (bill) acceptor, a printer 168, an accounting network 170, a progressive current loop 172 and a network link 174

The back plane 146 optionally includes connectors for external video sources 180, expansion buses 182, game or other displays 184, an SCSI port 188 and an interface 190 for at least one card reader 192 (debit/credit, player card, etc.) and key pad 194. The back plane 146 also preferably includes means for coupling a plurality of reel driver boards 196 (one per reel) which drive physical game reels 198 with a shaft encoder or other sensor means to the processor board 142 and main board 144. Of course, the reels may be similarly implemented electronically by display as video images, technology for such an approach being well known and widely employed in the art. In such an instance, reel driver boards 196 and physical game reels 198 with associated hardware are eliminated and the game outcome generated by the random number generator on main board 144 is directly displayed on a high-resolution monitor 162 and, optionally, on a separate game display device 178, as known in the art. Other gaming machine configurations for play of different wagering games such as video poker games, video blackjack games, video Keno, video bingo or any other suitable primary games are equally well known in the art. It will also be understood and appreciated by those of ordinary skill in the art that selected components of gaming device 100 may be duplicated for play of a primary game linked to a bonus game or event in accordance with the present invention, in that at least a separate board with a second random number generator may be employed, with associated peripherals and links thereto, for play of the bonus game. In the conventional situation wherein the bonus game of the present invention may be operably coupled as a "top box" or otherwise associated with a conventional, existing gaming machine configured for play of a base game, many of the components illustrated in FIG. 1 and described with respect thereto will be duplicated, including separate software and associated memory for conducting play of the bonus game with associated pay tables for the bonus awards.

Gaming machine 100 may be used to play the primary game that activates the bonus game of the present invention and as a terminal for play of the bonus game. The gaming machine 100 may be configured as a reel-type gaming machine, a video gaming machine which simulates reels or enables play of a card game, or any other type of mechanical or electronic gaming device known in the art for play of the primary game. In one exemplary embodiment, the gaming machine 100 is configured with a five-reel, multiple pay line spinning reel game as the primary game.

Figure 2:
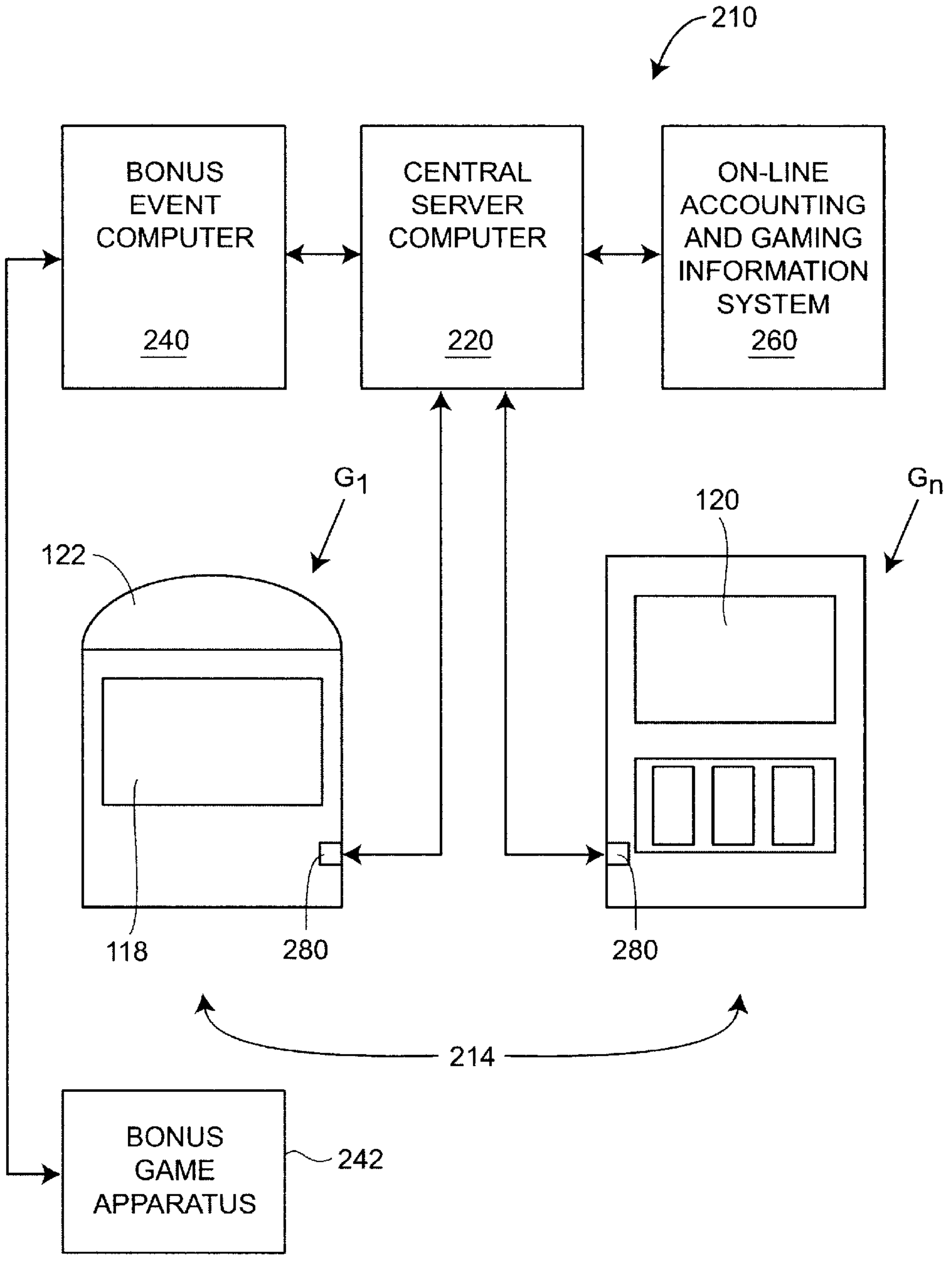
FIG. 2 is a diagrammatic representation of a competitive bonus gaming network according to the present invention.

In one embodiment of the present invention, multiple gaming machines 100 located at a particular casino site comprise a bank or other plurality 214 of gaming machines $G_1, G_2 \ldots G_n$ which may be configured, by way of example only, as gaming machines 100. In implementation of the present invention, the gaming machines $G_1, G_2 \ldots G_n$ offering play of the bonus game of the present invention may be deployed, as schematically depicted in FIG. 2, in a gaming network 210 including a central server computer 220 operably coupled to a plurality 214 of gaming machines $G_1, G_2 \ldots G_n$ which may include both electronic and reel type game machines. It is notable that, unless the gaming network 210 is configured for progressive play, a variety of different makes of gaming machines $G_1, G_2 \ldots G_n$ offering widely different games may be incorporated in gaming network 210, since the bonus event operates independently of the primary game on each gaming machine. The central server computer 220 automatically interacts with a plurality of gaming machines $G_1, G_2 \ldots G_n$ to activate a bonus event.

More specifically, and again referring to FIGS. 1 and 2, the gaming network 210 includes a central server computer 220, a bonus event computer 240 and a plurality of gaming machines $G_1, G_2 \ldots G_n$. The functions of central server computer 220 and bonus event computer 240 may be performed by a single computer. Each gaming machine $G_1, G_2 \ldots G_n$ includes a controller assembly 280 operably coupled to the central server computer 220. Each controller assembly 280 is comprised of a controller unit designed to facilitate transmission of signals from its associated individual gaming machine $G_1, G_2 \ldots G_n$ to central server computer 220, which monitors networked gaming machines $G_1, G_2 \ldots G_n$. In addition, the controller assembly 280 includes a network interface board fitted with appropriate electronics for each specific make and model of each individual gaming machine $G_1, G_2 \ldots G_n$.

Referring to FIG. 2, in electronic video games, the central server computer 220 is operably coupled to at least one video game display element 118 as shown at the left-hand side of FIG. 2 and sequesters a portion of the video game display element 118 for displaying video attract sequences to attract potential players. Video game display element 118 may be used for display of both the primary and bonus games. Where the gaming network 210 includes reel-type game machines $G_1, G_2 \ldots G_n$, as shown at the right-hand side of FIG. 2, the central server computer 220 may be operably coupled to at least one active display element 120 so that potential players receive a clear indication of attract sequences and the active display element may be used as a video display for the bonus game. As shown at the left-hand side of FIG. 2, the gaming machines $G_1, G_2 \ldots G_n$ may also be provided with a second video display 122 as an alternative to sequestering a portion of the video game display element 118 for displaying video attract sequences and the bonus game. In addition, the central server computer 220 may include sound-generating hardware and software for producing attractive sounds orchestrated with the video attract sequences at each of gaming machines $G_1, G_2 \ldots G_n$ if such is not already incorporated therein. The games support input and output between the player and the game for such devices as heads up display, joystick, keyboard, mouse and data glove via interface modules connected through the expansion bus or buses 182 and SCSI port 188.

The attractive multimedia video displays and dynamic sounds may be provided by the central server computer 220 by using multimedia extensions to allow gaming machines $G_1, G_2 \ldots G_n$ to display full-motion video animation with sound to attract players to the machines. During idle periods, the gaming machines $G_1, G_2 \ldots G_n$ preferably display a sequence of attraction messages in sight and sound. The videos may also be used to market specific areas of the casino and may be customized to any informational needs.

Furthermore, the gaming network 210 includes bonus event computer 240 operably coupled to the central server computer 220 for scheduling bonus parameters such as the type of bonus game, pay tables and players. The bonus game may be conducted solely on the bonus event computer 240 and visible manifestations of the bonus game including the outcome thereof displayed as video images on one or more bonus game displays 236 as further discussed below.

Alternatively, a separate bonus game apparatus 242 for providing an actual physical implementation of the bonus game, such as, for example, an actual roulette wheel, may be operably coupled to bonus event computer 240. Bonus event computer 240 may be employed to initiate the bonus game on bonus game apparatus 242 and to receive communications therefrom indicative of the course of the bonus game and its outcome for determination of winners and losers and issuance of bonus awards resulting from winning wagers. Preferably, the gaming network 210 further includes a real-time or on-line accounting and gaming information system 260 operably coupled to the central server computer 220. The accounting and gaming information system 260 includes a player database for storing player profiles, a player tracking module for tracking players and a pit, cage and credit system for providing automated casino transactions.

As previously implied, a bank of gaming machines $G_1$, $G_2$ . . . $G_n$ may be networked together in a progressive configuration, as known in the art, wherein a portion of each wager to initiate a primary game may be allocated to bonus event awards. In addition, and referring to FIG. 3, a host site computer 320 is coupled to a plurality of the central server computers 220 at a variety of remote gaming sites $C_1$, $C_2$ . . . $C_n$ for providing a multisite linked automated bonus gaming system 310 which, optionally, may be configured for progressive play.

Preferably, the host site computer 320 will be maintained for the overall operation and control of the system 310. The host site computer 320 includes a computer network 322 and a communication link 324 provided with a high-speed, secure modem link for each individual casino site $C_1$, $C_2$ . . . $C_n$.

Each casino site $C_1$, $C_2$ . . . $C_n$ includes the central server computer 220 provided with a network controller 230 which includes a high-speed modem operably coupled thereto. Bidirectional communication between the host site computer 320 and each casino site central server 220 is accomplished by the set of modems transferring data over communication link 324.

A network controller 230, a bank controller 232 and a communication link 234 are interposed between each central server computer 220 and the plurality of attached gaming machines $G_1$, $G_2$ . . . $G_n$ at each casino site $C_1$, $C_2$ . . . $C_n$. In addition, the network controller 230, the bank controller 232 and the communication link 234 may optionally be interposed between each central server computer 220 and a separate bonus game display 236 at each casino site $C_1$, $C_2$ . . . $C_n$. However, the system 310 may include hardware and software to loop back data for in-machine meter displays to communicate with bonus event award insert areas on gaming machines $G_1$, $G_2$ . . . $G_n$.

As illustrated in FIG. 2 and by way of exemplary implementation of the present invention, the bank 214 of gaming machines $G_1$, $G_2$ . . . $G_n$ is connected or linked with at least one bonus game display 236 to form a competitive bonus gaming network 210. In a preferred embodiment, the bank of gaming machines 214 comprises twelve gaming machines $G_1$, $G_2$ . . . $G_n$, where "n" equals twelve, connected or linked with the bonus game display 236 through communication link 234. The bonus game of the present invention is displayed on the at least one bonus game display 236. The multiple gaming machines are represented in FIG. 2 as $G_1$ through $G_n$, where $G_1$ is depicted as an electronic slot machine and $G_n$ is depicted as a reel type slot machine. Although only twelve gaming machines are networked in the example illustrated in FIG. 2, it will be readily apparent to one of ordinary skill in the art that any number of gaming machines $G_1$, $G_2$ . . . $G_n$ may be used in the present invention.

Bonus game displays 236 employed in implementation of the present invention may be configured as a relatively large liquid crystal display ("LCD") screen or a plurality of such screens. The screen is relatively large in comparison to the high-resolution monitor 162 or other game display device 178 of the gaming machine 100. The bonus game display or displays 236 may be positioned in an area above the gaming machines $G_1$, $G_2$ . . . $G_n$ so that its screen(s) is/are visible to all players at the bank 214 of gaming machines $G_1$, $G_2$ . . . $G_n$. Bonus game display 236 may comprise other types of display screens known in the art, including cathode ray tube (CRT) screens, plasma display screens, and/or screens based on light-emitting diode (LED) technology. Bonus game display 236 may be a display screen configured for multiple uses and/or concurrent display of other casino-sponsored information. For example, bonus game display 236 may be used in association with a Sports Book venue of the casino during periods in which bonus game display 236 is temporarily not used for the purposes of the present invention.

Gaming machines $G_1$, $G_2$ . . . $G_n$ may be connected to bonus game display 236 through communication link 234. Communication link 234 may be any of a variety of communication links known in the art, including, but not limited to: twisted-pair wire, coaxial cable, fiber optic, Ethernet, token ring, bus line, Fibre Channel, ATM, standard serial connections, LAN, WAN, Intranet, Internet, radio waves, or other wireless connections.

The player of a primary game at one of gaming machine $G_1$, $G_2$ . . . $G_n$ wins entry into the bonus game by achieving one or more specific outcomes or by meeting other selected criteria associated with play of the primary game. These specific outcomes activate the bonus game. Different specific outcomes may activate various features of the bonus game. In the present invention, at least two specific outcomes may be employed to activate the various features of the bonus game. For example, a first specific outcome may be used to allow a player to compete against other players in the bonus game by assuming a role as the house while a second specific outcome allows a player to participate in the bonus game playing against the house. The specific outcomes achieved may also result in different entry amounts characterized as "wagers" in the bonus game or in different "wager" types.

In one currently preferred embodiment, the bonus game simulates a traditional casino table game. In an exemplary embodiment, the casino table game may be roulette. However, other casino table games may be used including, but not limited to, twenty one (blackjack), craps, poker, pai gow, and baccarat.

In an exemplary embodiment, to qualify for the bonus game, a special symbol or element may be provided on one or more of the reels of the slot machine of the primary game. These symbols are referred to as "event symbols." For example, a specific number of event symbols may allow a player to participate in the bonus game while a higher number of event symbols allows the player to assume the role as the house. In the exemplary embodiment, the event symbol on the reels of the slot machine is a poker chip. In order to potentially qualify for play in the bonus game, the player may be required to wager a maximum bet so as to activate all of a plurality of possible paylines. If the player is wagering on all paylines and receives four poker chips anywhere on the screen of the high-resolution monitor 162 or other game display device 178, he or she activates the bonus game and may participate in the bonus roulette game by placing a wager on the bonus roulette board. It is possible that multiple players may simultaneously activate this feature of the bonus game, in which case each player may qualify to place a wager on the bonus roulette board. It will be readily apparent to one of ordinary skill in the art that other event symbols may be used to activate the bonus game. It will also be readily apparent that the bonus game may be configured for activation if the player gets more or less than four event symbols. Of course, the number of event symbols required to activate the bonus game may depend on how frequently the particular gaming establishment wants the bonus game activated. However, it is anticipated that the number of event symbols obtained in the primary game and required to activate the bonus game may be, by way of example only, in the range of three to five event symbols.

Upon activating the bonus game, the player is notified of his opportunity to participate in the bonus game by an interaction with his gaming machine 100, which is one of the bank or other plurality 214 of gaming machines $G_1$, $G_2$ . . . $G_n$. This interaction may occur through the appearance of a message on the touch screen 166 of gaming machine 100. The player may place a virtual, one-chip wager for entry into the bonus game by interacting with his gaming machine 100, such as through the touch screen 166. In the roulette game of the preferred embodiment, the player may place any of the traditional roulette wagers on the bonus roulette board. When the chip is placed, the player's wager appears on the game display device 178 of gaming machine 100 and the at least one bonus game display 236. If the same player wins another wager before the bonus game is started, he may add another virtual chip to the existing wager (i.e., place it on the same area as the existing wager) or make a different wager. The player may also choose to defer participating in the bonus game, thus allowing him to accumulate more virtual chips to wager and to enhance his wagering opportunities.

Once activated, the bonus game may start immediately. However, the bonus game may also start after a certain number of players has qualified for the bonus game, when there is at least one player who wishes to assume the role of the house, at set intervals (activate a bonus game one-half hour after conclusion of the last bonus game), according to a specific schedule (every hour on the half hour), or randomly throughout the day.

When the bonus game is ready to start, any players currently qualified to participate may be queried through the touch screen 166 or other communication element associated with gaming machine 100 as to whether they wish to participate in the bonus game. Alternatively, the players may be automatically entered in the bonus game and advised of their entry through the touch screen 166 and/or an audio signal, such as a trumpet blast, bells, music, etc.

The player may or may not have a choice as to the exact nature of the wager into the bonus game. For example, the amount of the wager and/or the wager selection in the bonus game may be determined by the amount of a wager and the specific outcome in the primary game. The wager selection includes the number upon which the wager is placed in the bonus roulette game of the preferred invention. Alternatively, the player may be allowed to determine both the wager amount and wager selection. Most typically, the wager amount and selection will be based upon the wager amount and the specific outcome in the primary game. However, the player may also place or adjust his wager from his or her credit meter.

In the exemplary embodiment, if the player is wagering on all paylines and receives five poker chips anywhere on the screen, he or she not only activates the bonus game but also qualifies to assume the role as the house. The player may assume this role in a variety of capacities, in addition to maintaining his role as a player. For example, the player may assume a full or partial role as the house or may decline the role altogether. The advantage of assuming this role is that the house always has an expected payback percentage of greater that 100%. Therefore, the player who assumes this role would be awarded the wagers, or a percentage of the wagers, lost by the other players participating in the bonus game. However, this player may also be obligated to pay the wagers won by the other players, which may be in excess of the "house" player's own wager, and is traditionally called "banking the game." If the player declines the role of the house, he may still qualify to participate as a player in the bonus game.

The player may participate in the bonus game both as a player and as the house if he has accumulated multiple wagers before the start of the bonus game. In the exemplary embodiment, this may be possible if the player qualified for the bonus game by achieving both four and five poker chips during outcomes of the primary game before the bonus game has started.

Before allowing any player to assume the role as the house (also termed as acting as the "house player"), the maximum amount at risk by the house can generally be computed from the wagers on the bonus game. The maximum amount at risk by a house player is the amount the house player would have in the "bank" from outcomes of his or her play of the primary game to risk as the house. If the bank amount is not less than the total maximum amount at risk, the house player may be permitted to take on the full role as the house. If the bank amount of an individual player is less than the total maximum amount at risk from wagers of all players not serving as the house, the house player in question may be permitted to take on the partial role as the house. When the bonus game is finished, the non-house player losses in the bonus game are added to the bank while the non-house player winnings are deducted from the bank and paid to the associated winner. The balance left in the bank is then paid to the player who assumed the role as the house for that round of bonus game play.

For a given wagering condition on the bonus game, the maximum amount at risk by the house may be calculated. For example, if a non-house player places a 1-chip wager on the number "7" on a roulette wheel, the payout for a win is 35 to 1 (36 chips returned for one chip wagered). Thus, the house is at risk of losing 35 credits even though there is only a 1 in 38 chance (assuming the existence of "0" and "00" bins on the roulette wheel in addition to bins one through 36) that the number "7" will be a winning number. If the non-house player (or another non-house player) places an additional 1-chip wager on the number "29," the maximum amount at risk by the house has now dropped to 34 credits because if either "7" or "29" hits or wins, the other number loses and the house receives that losing wager. However, if the non-house player or players place an additional 1-chip wager on "odd" numbers, where the payout is 1 to 1 (two chips returned for one wagered), the maximum amount at risk has now risen to 35 credits because if "7" or "29" hits, the house must pay 35 credits to that winning number, take 1 credit from the other, losing number, and pay 1 credit to the "odd" wager.

In the exemplary embodiment, the player who assumes the role of the house receives a "bank" amount of 500 credits. These credits are displayed on the game display device 178 of the player's gaming machine 100. If the amount at risk in the bonus game is less than 500 credits, the player can bank the entire bonus game as the house and take what is remaining in the bank after any winning non-house players have been paid, augmented by non-house player losses. If the amount at risk is greater that 500 credits, the player takes a share of the house equal to 500 divided by the amount at risk. For example, if the amount at risk wagered by non-house players is 800 credits, the player will receive 62.5% (500/800) of the house.

Other approaches may be envisioned if the bank amount is less than the maximum amount at risk. For instance, wagering by non-house players in the bonus game may not be allowed, either by design or by exclusion, if it would increase the maximum amount at risk beyond the amount that will be banked by the player assuming the role of the house, such player also being termed the "house player" for convenience. Stated another way, the bonus game may be controlled to preselect a cumulative available wager pool associated with a number of non-house players qualified for the bonus game and assign these non-house players to a round of bonus play against a given house player. For example, when a house player qualifies for the bonus game, non-house players qualifying in time order may be matched with that house player until the total amount at risk by non-house players approaches, but does not exceed, the "bank" of the house player. Further, the bonus game may be configured so that players qualifying for a bonus game as non-house players may be given the option to enter a bonus game until the total amount at risk by non-house players would exceed the "bank" of the house player. At that juncture, the non-house player whose entry into the bonus game would "break the bank" is denied entry to the bonus game player pool being assembled and is deferred to a subsequent bonus game. In this respect, the bonus game may be likened to a gaming table with a given number of seats, the number of seats varying with the amount of wagers available to the mix of players qualifying for a seat in some bonus game. The bonus game may also be configured to assemble a group of non-house players having different amounts available to wager in bonus game play to produce an amount at risk which will always be at, or slightly less than, the amount of the bank provided by the house player.

As another iteration of the bonus game, the house player may also be allowed to risk additional credits from his personal credit meter to augment the bank amount available to him. In addition, the bonus game may be configured such that the amounts that the non-house players can win relate to the amount in the bank. In that vein, "high roller" non-house players who have accumulated large amounts to wager in the bonus game during play of the primary game may be matched against a "high roller" house player. Similarly, non-house players having only minimal amounts to wager on the bonus game may be matched against a house player with a small bank. The combination of a primary game and a bonus game according to the invention may be configured so that large "sums" to be wagered in the bonus game are accumulated by play of the primary game in terms of sums wagered in the primary game, number of plays of the primary game, type of selected outcome in the primary game which enables bonus play (e.g., less frequent winning outcomes in the primary game enable higher-level wagers in the bonus game), or other criteria. Similarly, the bonus game may be configured so that a player must accumulate a certain number of bonus game credits during play of the primary game to place in the "bank" and thus enable or qualify him or her to assume the house role. In this aspect of the invention, a player who likes being the house player can wager on and play the primary game until a threshold number of credits is accumulated. Of course, such credits might be accumulated over a number of sessions of play of the primary game and stored with a player tracking card or other memory element either carried by the player or resident in the casino database.

Furthermore, the bonus game may be configured to include a reserve pool funded by a portion of the primary or bonus game action and used to cover the losses exceeding the bank amount during bonus game play.

As discussed above, if the bank amount available to the house player is less than the maximum amount at risk, the player may be required to assume the partial role as the house or, optionally, to add to the bank to cover the maximum amount at risk. In addition, the player may choose to take on a role as part of the house if he does not want the risk of assuming the full role of the house. In such a case, the player may choose the percentage of his partial interest or the percentage of the risk taken by the house player may be chosen by the actual house, i.e., the casino operator. For example, the house player may elect to cover 50% of the house losses, and receive 50% of the house winnings, with the house (casino) handling the balance of losses and receiving the balance of the winnings from losses of non-house players. The percentage of the player's partial interest may be based upon the bank amount as a percentage of the amount at risk, possibly rounded to a percentage friendly to the casino operator. The player might also choose the amount of the bank, rather than a percentage, that he wishes to place at risk. In addition, the house player may choose the degree of his participation in his role as the house under constraints set by the bonus game architecture. For example, the house player may be permitted to choose to take some predetermined percentage of the bank amount rather than assuming the role of the house, for example, 25%, 50% or 75% of the bank. Finally, more than one player may be permitted to assume a partial role as the house, covering house losses and receiving house winnings in proportion to their contribution to the bank. For example, if non-house players wish to wager a total of 1000 credits, house player A may bank 400 credits of the house, house player B may bank 350 credits of the house, and house player C may bank the remaining 250 credits to cover all the wagers of the non-house players totaling 1000 credits.

Once the non-house players have placed their wagers, in the exemplary embodiment, the roulette wheel (actual or video-simulated) is spun and the bonus game results are determined. The losing wagers of the non-house players are added to the bank and multiplied by the percentage of the house (if less than all) assumed by the player who took on the role as the house. Each win to a non-house player is paid out to the gaming machine $G_1$, $G_2$ . . . $G_n$ from which the associated wager was placed, and the sum of these amounts, multiplied by the percentage of the house assumed by the house player (if less than all), is deducted from his or her bank used to fund that bonus game round. The remaining balance in the house player's bank is then paid out to the gaming machine G of the house player.

It is possible that more than one player may simultaneously achieve the specific outcome that qualifies them to assume the role of the house. For example, one gaming machine G could first achieve a requisite specific outcome or accumulation of outcomes in play of a primary game to enable the player at that gaming machine G to serve as the house. Approximately simultaneously, a second gaming machine may also achieve the requisite specific outcome or accumulation of outcomes. In this situation, both players may be automatically provided the option to bank the game together, or may be provided the option to share equally in banking the game, with each player receiving a portion of the house. The relative portions shared may be made dependent upon the configuration of the bonus game wherein, for example, a house role may be automatically equally shared by qualifying players, may be shared dependent upon the proportions of different amounts available for banking the game to different players, may be dependent upon an affirmative decision by each player as to the amount of available bonus game credits to wager when banking the game, or may be a combination of aspects of the foregoing.

Various approaches are possible to handle the situation of a gaming machine G that is abandoned with outstanding credits remaining on the gaming machine which might be wagered in the bonus game. The outstanding credits might be removed as soon as the machine is recognized as being abandoned or they might remain until play of the next bonus game is activated and then removed if the gaming machine is not qualified for bonus play. Optionally, such credits may be added to the bank and distributed for use by the player who next activated the bonus game by qualifying for a role as the house player. As noted above, the bonus game credits may be made associable with, and portable by, a player, through use of known player tracking techniques. It is readily apparent to one of ordinary skill in the art that other options may be envisioned.

While the exemplary embodiment discloses using at least one gaming machine G located at one casino site, it is possible for remote players of the primary game to qualify for the bonus game of the present invention using the gaming system 310 previously described. For instance, these remote players may be playing the primary game on networked gaming machines at mutually remote sites within a casino as well as at a plurality of mutually remote casino sites or on personal computers or other devices serving as terminals. As is known in the art, software to play the primary game may be downloaded onto a personal computer. Upon qualifying for the bonus game, which may occur in a manner similar to qualification on a gaming machine $G_1$, $G_2$ . . . $G_n$ located at the casino site, the player may be provided with an opportunity to wager on the bonus game. It is contemplated that the software downloaded to the personal computer may include the bonus game of the present invention or sufficient communication capability to interact in real time with a host server. The existence and further development of broadband communication links including DSL, cable and even broadband wireless may enable remote play from a variety of locations and using diverse hardware such as hand-held wireless terminals at a casino, personal digital assistants (PDAs), etc. Further, the bonus game may be posted on an Internet site associated with the casino or other sponsor of the bonus game. The bonus game would be accessible to the player if the specific outcomes are achieved in the primary game. The player may then participate in the bonus game through his personal computer terminal via the Internet, such as through streaming audio or video.

Figure 3:
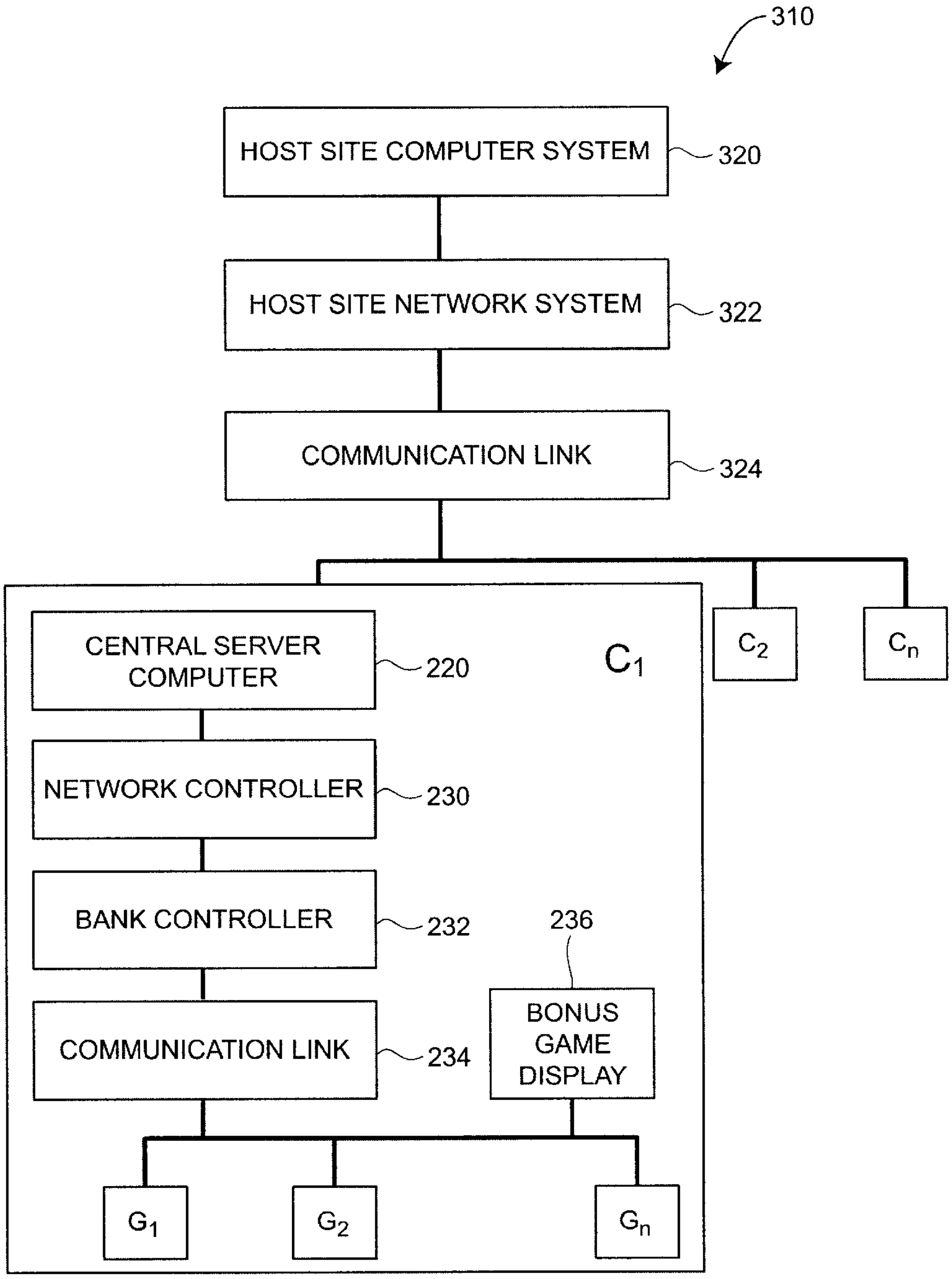
FIG. 3 illustrates an exemplary competitive bonus game system according to the present invention.

As shown in FIG. 3, and previously described, system 310 includes a host site computer 320 operably coupled to multiple central server computers 220, which may be located at a variety of remote casino or other gaming sites. Alternatively, central server computers 220 may be used to interface with a plurality of personal computers, PDAs or other terminals. Preferably, the host site computer 320 will be maintained for the overall operation and control of the competitive bonus gaming system 310. Each physical or virtual gaming site, represented as $C_1$, $C_2$ . . . $C_n$ in FIG. 3, includes the network controller 230, the bank controller 232, and the communications link 234 interposed between each central server computer 220 and the multiple gaming machines schematically illustrated as $G_1$, $G_2$ . . . $G_n$. As alluded to above, gaming machines $G_1$, $G_2$ . . . $G_n$ may comprise conventional gaming machines, personal computers, wired or wireless terminals, PDAs, or a combination thereof. Thus, the term "gaming machine" is used herein in its broadest sense and encompasses any device used as a terminal by at least one player to participate in the bonus game.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A gaming system, comprising:
- a gaming machine comprising:
  - a display device;
  - a wager input device; and
  - a computer coupled to he display device and the wager input device,
    - the computer programmed to receive a wager in a primary game from at least one player via the wager input device,
    - the computer programmed to cause an image representing the primary game to be generated on the display device,
    - the computer programmed to determine an outcome of the primary game represented by the image;
    - the computer programmed to determine a payout associated with the outcome of the primary game;
    - the computer programmed to determine whether at least one event has occurred during the primary game; and
    - the computer programmed to determine a possible role of the at least one player in a secondary game as at least one of a role of a house player and a role of a non-house player in response to the occurrence of the at least one event.

2. The gaming system of claim 1, wherein the computer is programmed to determine that the possible role of the at least one player comprises both the role as the house player and the role as the non-house player.

3. The gaming system of claim 1, wherein the computer is programmed to allow the at least one player to decline the role as the house player.

4. The gaming system of claim 1, wherein:
- the computer is programmed to receive a wager from a non-house player during the secondary game via the wager input device; and
- the computer is programmed to assign a bank amount to a house player.

5. The gaming system of claim 4, wherein the wager received from the non-house player is based on at least one of the wager received in the primary game and the outcome of the primary game.

6. The gaming system of claim 4, wherein:
- the computer is programmed to assign a total bank amount to the house player in a full role, the total bank amount being sufficient to cover the wager received from the non-house player; and the computer is programmed to assign a partial bank amount to the house player in a partial role, the partial bank amount being sufficient to cover a portion of the wager received from the non-house player.

7. The gaming system of claim 6, wherein the computer is programmed to determine the partial bank amount as at least one of a value that is a percentage of the total bank amount and a value not to exceed the total bank amount.

8. The gaming system of claim 7, wherein the partial bank amount is determined by the house player in the partial role or by a gaming system operator.

9. The gaming system of claim 6, wherein the computer is programmed to determine a maximum-amount-at-risk value.

10. The gaming system of claim 9, wherein the maximum-amount-at-risk value is based on the wager received from the non-house player in the secondary game.

11. The gaming system of claim 10, wherein the computer is programmed to determine whether the house player will play the secondary game in the full role or the partial role according to a comparison of the maximum-amount-at-risk value to the total bank amount.

12. The gaming system of claim 11, wherein:

the computer is programmed to determine that the house player will play the secondary game in the partial role when the total bank amount is less than the maximum-amount-at-risk value; and the computer is programmed to determine that the house player will play the secondary game in the full role when the total bank amount is not less than the maximum-amount-at-risk value.

13. The gaming system of claim 1, wherein:

the computer is programmed to determine an outcome of the secondary game;

the computer is programmed to determine a payout for the non-house player associated with the outcome of the secondary game; and the computer is programmed to determine a payout for the house player associated with the outcome of the secondary game.

14. The gaming system of claim 13, wherein the computer is programmed to determine a payout for the house player in the partial role by adding the portion of the wager received from the non-house player to the partial bank amount if the house player in the partial role wins the secondary game.

15. The gaming system of claim 13, wherein the computer is programmed to determine a payout for the house player in the full role by adding the wager received from the non-house player to the total bank amount if the house player in the full role wins the secondary game.

16. The gaming system of claim 1, wherein the at least one event comprises at least one of an occurrence of a symbol in the primary game, an occurrence of a combination of symbols in the primary game, at least one outcome of the primary game, a duration of continuous play of the primary game, a number of times the primary game is played in a period of time, and a wager in the primary game.

17. The gaming system of claim 1, wherein the secondary game is a casino table game.

18. The gaming system of claim 17, wherein the secondary game is one of the following casino table games: roulette, blackjack, craps, poker, pai gow, or baccarat.

19. The gaming system of claim 1, wherein the secondary game is an electronic game or a mechanical game.

20. The gaming system of claim 19, wherein the primary game is one of the following electronic games: video poker, video blackjack, video slots, video keno, or video bingo.

21. The gaming system of claim 1, comprising a plurality of the gaming machines linked together to form a network selected from the group consisting of a LAN, a WAN, an intranet, and the Internet.

22. The gaming system of claim 21, wherein each of the gaming machines is linked to a central controller located at a remote location from the plurality of gaming machines.

* * * * *

UNITED STATES PATENT AND TRADEMARK OFFICE

CERTIFICATE OF CORRECTION

PATENT NO. : 6,800,026 B2
DATED : October 5, 2004
INVENTOR(S) : Lee E. Cannon

It is certified that error appears in the above-identified patent and that said Letters Patent is hereby corrected as shown below:

Column 14,
Line 28, cancel "he" and insert -- the --.

Signed and Sealed this

Twenty-first Day of June, 2005

JON W. DUDAS
*Director of the United States Patent and Trademark Office*